United States Patent
Beato (10) Patent No.: US 12,467,005 B2
(45) Date of Patent: Nov. 11, 2025

(54) ALTERNATIVE METHANOL TO OLEFIN (MTO) PROCESS

(71) Applicant: TOPSOE A/S, Kgs. Lyngby (DK)

(72) Inventor: Pablo Beato, Nordhavn (DK)

(73) Assignee: TOPSOE A/S, Kgs. Lyngby (DK)

( * ) Notice: Subject to any disclaimer, the term of this patent is extended or adjusted under 35 U.S.C. 154(b) by 193 days.

(21) Appl. No.: 18/245,828

(22) PCT Filed: Sep. 24, 2021

(86) PCT No.: PCT/EP2021/076372
§ 371 (c)(1),
(2) Date: Mar. 17, 2023

(87) PCT Pub. No.: WO2022/063993
PCT Pub. Date: Mar. 31, 2022

(65) Prior Publication Data
US 2024/0026236 A1 Jan. 25, 2024

(30) Foreign Application Priority Data
Sep. 25, 2020 (DK) .......................... PA 2020 01109

(51) Int. Cl.
*C10G 69/02* (2006.01)
*C07C 1/20* (2006.01)
(Continued)

(52) U.S. Cl.
CPC ....... *C10G 69/126* (2013.01); *C10G 2300/10* (2013.01); *C10G 2400/20* (2013.01); *C10G 2400/22* (2013.01)

(58) Field of Classification Search
None
See application file for complete search history.

(56) References Cited

U.S. PATENT DOCUMENTS

| 4,021,502 A | 5/1977 | Plank et al. |
| 4,211,640 A | 7/1980 | Garwood et al. |

(Continued)

FOREIGN PATENT DOCUMENTS

| CN | 104059682 A | 9/2014 |
| CN | 108970638 A | 12/2018 |

(Continued)

OTHER PUBLICATIONS

U.S. Appl. No. 18/727,130, Niels Christian Schjødt, filed Jul. 8, 2024.

(Continued)

*Primary Examiner* — Tam M Nguyen
(74) *Attorney, Agent, or Firm* — Boone IP Law (57) ABSTRACT

A process and plant for producing an olefin stream, comprising passing a feedstock stream comprising oxygenates over a catalyst thereby forming an olefin stream; using a first reactor set including a single reactor or several reactors for the partial or full conversion of the oxygenates; and in series arrangement with the first reactor set, using a second reactor set including a single reactor or several reactors, for the further conversion of the oxygenates, and a phase separation stage in between the first reactor set and the second reactor set, for thereby forming the olefin stream.

13 Claims, 1 Drawing Sheet

US 12,467,005 B2
Page 2

(51) Int. Cl.
*C07C 2/12* (2006.01)
*C10G 69/12* (2006.01)

(56) References Cited

U.S. PATENT DOCUMENTS

| | | | |
|---|---|---|---|
| 4,227,992 A | 10/1980 | Garwood et al. | |
| 4,433,185 A | 2/1984 | Tabak | |
| 4,456,779 A | 6/1984 | Owen et al. | |
| 4,476,338 A | 10/1984 | Chang et al. | |
| 4,482,772 A | 11/1984 | Tabak | |
| 4,613,719 A | 9/1986 | Kukes et al. | |
| 4,684,757 A | 8/1987 | Avidan et al. | |
| 4,740,645 A | 4/1988 | Garwood et al. | |
| 4,898,717 A | 2/1990 | Hsia et al. | |
| 5,146,032 A * | 9/1992 | Harandi | C07C 2/12 585/329 |
| 5,177,279 A | 1/1993 | Harandi | |
| 5,254,767 A | 10/1993 | Dwyer | |
| 5,268,515 A * | 12/1993 | Irvine | C07C 29/04 568/696 |
| 6,372,949 B1 | 4/2002 | Brown et al. | |
| 6,403,854 B1 * | 6/2002 | Miller | C07C 1/20 585/804 |
| 7,482,300 B2 | 1/2009 | Lai et al. | |
| 8,524,970 B2 | 9/2013 | Rothaemel et al. | |
| 9,505,670 B2 * | 11/2016 | Vijayakumari | C07C 1/20 |
| 9,957,449 B2 | 5/2018 | Luebke et al. | |
| 11,492,310 B2 * | 11/2022 | Olayiwola | C07C 7/11 |
| 2002/0103406 A1 | 8/2002 | Mathys et al. | |
| 2006/0161035 A1 * | 7/2006 | Kalnes | C07C 4/06 585/639 |
| 2007/0131581 A1 | 6/2007 | Lai et al. | |
| 2009/0187057 A1 | 7/2009 | Chewter et al. | |
| 2010/0305376 A1 | 12/2010 | Rothaemel et al. | |
| 2012/0271081 A1 | 10/2012 | Nesterenko et al. | |
| 2014/0018593 A1 * | 1/2014 | Birke | C07C 1/20 422/187 |
| 2015/0191666 A1 | 7/2015 | Bradin | |
| 2016/0145169 A1 * | 5/2016 | Rothaemel | C07C 1/20 585/254 |
| 2016/0312131 A1 | 10/2016 | Luebke et al. | |
| 2017/0121237 A1 | 5/2017 | Ilias et al. | |
| 2018/0155631 A1 | 6/2018 | O'neill et al. | |
| 2018/0155637 A1 | 6/2018 | Mccarthy et al. | |
| 2019/0176136 A1 | 6/2019 | Beato et al. | |
| 2020/0056106 A1 | 2/2020 | Deimund et al. | |
| 2020/0399190 A1 | 12/2020 | Behkish | |
| 2024/0010938 A1 * | 1/2024 | Hidalgo Vivas | C10G 47/02 |
| 2024/0301296 A1 * | 9/2024 | Ingram | C07C 1/24 |

FOREIGN PATENT DOCUMENTS

| | | |
|---|---|---|
| CN | 110023458 A | 7/2019 |
| CN | 111111765 A | 5/2020 |
| CN | 111558393 A | 8/2020 |
| CN | 113289677 A | 8/2021 |
| EP | 1228166 A1 | 8/2002 |
| EP | 2123736 A1 | 11/2009 |
| EP | 3040324 A1 | 7/2016 |
| WO | 0129152 A1 | 4/2001 |
| WO | 2007135053 A1 | 11/2007 |
| WO | 2010099885 A1 | 9/2010 |
| WO | 2011071755 A2 | 6/2011 |
| WO | 2011138520 A2 | 11/2011 |
| WO | 2013175204 A1 | 11/2013 |
| WO | 2014008337 A1 | 1/2014 |
| WO | 2018045652 A1 | 3/2018 |
| WO | 2018071905 A1 | 4/2018 |
| WO | 2018106396 A1 | 6/2018 |
| WO | 2018106397 A1 | 6/2018 |
| WO | 2019020513 A1 | 1/2019 |
| WO | 2019158687 A1 | 8/2019 |
| WO | 2019228797 A1 | 12/2019 |
| WO | 2020060591 A1 | 3/2020 |

OTHER PUBLICATIONS

Baerlocher, et al., "Atlas of Zeolite Framework Types", Structure Commission of the International Zeolite Association by Elsevier, Sixth Revised Edition, 2007, 405 pages.
European Search Report dated Feb. 24, 2021, issued by the European Patent Office in corresponding European Application No. 0198386.3-1101. (8 pages).
International Search Report (PCT/ISA/210) and Written Opinion (PCT/ISA/237) mailed on Dec. 10, 2021, by the European Patent Office as the International Searching Authority for International Application No. PCT/EP2021/076369. (16 pages).
International Search Report (PCT/ISA/210) and Written Opinion (PCT/ISA/237) mailed on Dec. 10, 2021, by the European Patent Office as the International Searching Authority for International Application No. PCT/EP2021/076372. (21 pages).
International Search Report (PCT/ISA/210) and Written Opinion (PCT/ISA/237) mailed on Dec. 10, 2021, by the European Patent Office as the International Searching Authority for International Application No. PCT/EP2021/076373, 16 pages.
Search Report mailed on Mar. 25, 2021, by the Danish Patent Office for Application No. PA 2020 01110, 9 pages.
Search Report mailed on Mar. 26, 2021, by the Danish Patent Office for Application No. PA 2020 01109. (9 pages).
Teketel et al., "Co-conversion of methanol and light alkenes over acidic zeolite catalyst H-ZSM-22: Simulated recycle of non-gasoline range products", Applied Catalysis A: General, 2015, pp. 68-76, vol. 494, No. 31.
Yarulina et al., "Suppression of the Aromatic Cycle in Methanol-to-Olefins Reaction over ZSM-5 by Post-Synthetic Modification Using Calcium", ChemCATChem, 2016, pp. 3057-3063, vol. 8, Issue 19.
First Office Action mailed on Jul. 13, 2024, by the China National Intellectual Property Administration for Chinese Application No. 2021800648879, 15 pages.
U.S. Appl. No. 18/849,228, Finn Joensen, Sep. 20, 2024.

* cited by examiner

ALTERNATIVE METHANOL TO OLEFIN (MTO) PROCESS

FIELD OF THE INVENTION

The present invention relates to the conversion of a feedstock comprising oxygenates such as methanol and/or dimethyl ether to an olefin stream preferably having a low content of aromatics, more preferably being essentially free of aromatics and ethylene (C2=), yet with a high content of higher olefins C3=-C8=, especially (C4=-C8=), and optionally the subsequent conversion of the olefin stream to a hydrocarbon stream comprising hydrocarbons boiling in the jet fuel range, particularly sustainable aviation fuel (SAF), by oligomerization and hydrogenation.

BACKGROUND OF THE INVENTION

Currently, processes for the conversion of oxygenates such as methanol to olefins (MTO) are able to produce ethylene and propylene as the main olefin products with the purpose of serving as feedstock for plastic production. When higher hydrocarbons are the desired product such as in e.g. methanol to gasoline (MTG) processes, around 30% of aromatics are typically formed. However, when producing hydrocarbons boiling in the jet fuel range, particularly sustainable aviation fuels (SAF), current requirements for do not allow the presence of aromatics in the olefin stream feed.

Due to society concerns about global climate change and the resulting political pressure on the aviation industries, the market for SAFs is expected to increase substantially during the next decades. Currently, a small number of biocatalytic and thermo-catalytic processes have been approved by ASTM to be able to produce SAFs. Hence, a pre-condition for the use of any SAF as aviation turbine fuel is an ASTM certification. So far, only a small number of processes, producing SAF or synthetic paraffinic kerosene (SPK) fuels have been approved by ASTM International (ASTM) Method D7566 for blending into jet fuel at levels up to 50%. One important general requirement is therefore, that the synthetic part of SAF (50 vol %) must be virtually free from aromatics, while the final SAF blend can contain up to 26.5 vol % aromatics.

So far, the only process that is foreseen to be able to produce relevant amounts of SAF is based on biomass derived Fischer-Tropsch (FT) synthesis, followed by multi-step and cost intensive refining of the FT product, with a moderate final selectivity towards jet-fuel. The present invention uses the well-known methanol to olefins (MTO) process as a more attractive route to obtain olefins at a higher selectivity. While methanol can be produced from many primary resources (including biomass and waste), it is expected that in times of low wind and solar electricity costs, the production of so-called e-methanol, as for instance disclosed in Applicants's WO 2019/020513, would be a possible sustainable front-end solution. Currently, the proposed process layouts for the conversion of methanol to jet fuel are multistep processes, consisting of at least MTO, oligomerization and hydrogenation which are all proven technologies but in combination do not appear very efficient, due to high recycle streams and very different process conditions for the individual steps.

Potential feedstocks for producing SAFs are generally classified as (a) oil-based feedstocks, such as vegetable oils, waste oils, algal oils, and pyrolysis oils; (b) solid-based feedstocks, such as lignocellulosic biomass (including wood products, forestry waste, and agricultural residue) and municipal waste (the organic portion); or (c) gas-based feedstocks, such as biogas and synthesis gas (syngas). Syngas, alcohols, sugars, and bio-oils can be further upgraded to jet fuel via a variety of synthesis, either fermentative or catalytic processes.

There is currently no viable one-step catalyst/process that would allow to convert a feedstock comprising oxygenates such as methanol directly into a hydrocarbon boiling in the jet fuel range, i.e. jet fuel, at least not at reasonable yields. To produce jet fuel starting from methanol, typically a three-step process is used consisting of: a) Methanol to olefins (MTO), b) Oligomerization of olefins, and c) Hydrogenation of long chain olefins. Conventional approaches to the conversion of methanol to gasoline or diesel hydrocarbon products were envisaged already in the late 1970s and early 1980s. Thus, U.S. Pat. Nos. 4,021,502, 4,211,640, 4,227,992, 4,433,185, 4,456,779, disclose process layouts based on classical MTO process conditions, i.e. high temperatures e.g. about 500° C. and moderate pressures e.g. about 1-3 bar, in order to obtain efficient conversion of methanol to olefins. However, under these conditions a significant amount of aromatic hydrocarbons (aromatics) is produced, e.g. 10-30 wt % or 10-35 wt % in the olefin stream, which needs to be separated and a relatively large volume of MTO product effluent has to be cooled and treated to separate a C2-light gas stream, which is unreactive, except for ethene which is reactive to only a small degree. The remaining of the olefin stream has to be pressurized to the substantially higher pressure of the oligomerization (OLI) reactor.

Hence, so-called Mobil-Olefin-to-Gasoline-Distillates (MOGD) process patents from the early 1990s such as U.S. Pat. No. 5,177,279 try to solve these problems and improve the overall operation efficiency by further process integration of MTO and oligomerization and reduce the investment costs by splitting the methanol stream between the MTO and the OLI reactor. The splitting of the methanol feed has two advantages: first it reduces the MTO reactor size at the same overall methanol conversion and secondly only half of the methanol is processed at the high temperature conditions of the MTO reactor, thereby reducing both, the aromatics and the C2-content.

U.S. Pat. No. 9,957,449 discloses a process for the producing hydrocarbons in the jet fuel range by oligomerization of renewable olefins having three to eight carbons.

U.S. Pat. No. 8,524,970 discloses a process for producing diesel of better quality, i.e. diesel with a higher cetane number comprising conversion of oxygenates to olefins, oligomerization of olefins and subsequent hydrogenation.

Applicant's US 20190176136 discloses the use of a ZSM-23 zeolite as catalyst for methanol to olefin conversion in a process step which is conducted at atmospheric pressure (about 1 bar) and 400° C., thereby producing a hydrocarbon stream with less than 5 wt % aromatics.

Yarulina et al, ChemCatChem 8 (2016) 3057-3063, discloses the use of Ca-modified ZSM-5 for methanol to olefins conversion with the purpose of achieving a high propylene selectivity, where the process is conducted at 1 bar and at high temperature of 500° C. The resulting olefin streams shows no formation of aromatics and a high selectivity for light olefins (C2=-C3=), yet low selectivity for higher olefins (C4=-C8=).

U.S. Pat. No. 7,482,300 discloses a composition comprising ZSM-48 crystals having a silica:alumina molar ratio of 110 or less, or at least 70, which is free of non-ZSM-48 seed crystals and free of ZSM-50. The composition is used for catalytic dewaxing.

US 2017/0121237 A1 discloses a process for converting oxygenate containing feedstocks to gasoline and distillates, in which methanol conversion catalysts is selected from a wide range of zeolites, including ZSM-48 and at the conditions of pressure being between 15 and 90 psig and the temperature being above 450° C.

U.S. Pat. No. 4,476,338 discloses a process for converting methanol and/or dimethyl ether to olefins comprising a major fraction of light olefins, at moderate temperature and atmospheric pressure comprising contacting the feed with an alumina crystalline zeolite catalyst designated as ZSM-48. This citation teaches (Ex. 1-2, Table 2) the use of ZSM-48 with a silica-to-alumina ratio (SAR) higher than 110, more specifically 113 or 180, and where methanol is converted over the zeolite catalyst at atmospheric pressure and a moderate temperature of 370° C. There is a significant production of aromatics, in the range 10-12 wt %

WO 2018/071905 A1 discloses the conversion of C2-C8 olefins to jet fuel and/or diesel fuel in high-yield from bio-based alcohols.

U.S. Pat. No. 4,613,719 A discloses oligomerization of olefins in a process for converting lower olefins to higher hydrocarbons used as liquid fuels.

In the above-mentioned U.S. Pat. No. 5,177,279, two possible general process layouts are disclosed: (1) classical two-step process with MTO and OLI/MOGD reactor in series and (2) a three-step process, including an intermediate "olefin interconversion" (MOI) reactor that converts the lower olefins (C2=-C3=) to higher olefins (C5=-C9=), increasing thereby the amount of higher (heavier) olefins from 25-35 wt % to 35-70 wt %. The latter process design provides more flexibility and only two reactors (MTO+ MOI) are used when gasoline is the desired product, while all three reactors are used when distillates are the preferred product.

SUMMARY OF THE INVENTION

As used herein, "MTO" (methanol to olefins) means the conversion of an oxygenate such as methanol to olefins.

As used herein, "OLI" means oligomerization.

As used herein, "Hydro" means hydrogenation.

As used herein, "Hydro/OLI" means a single combined step comprising hydrogenation and oligomerization.

As used herein, "MTJ" means methanol to jet fuel and is interchangeable with the term "overall process" or "overall process and plant", which means a process/plant combining MTO, OLI and Hydro, whereby a feedstock comprising oxygenates such as methanol is converted into jet fuel.

As used herein, the terms "jet fuel" and "hydrocarbons boiling in the jet fuel range" are used interchangeably and have the meaning of a mixture of C8-C16 hydrocarbons boiling in the range of about 130-300° at atmospheric pressure.

As used herein, "SAF" means sustainable aviation fuel or aviation turbine fuel, in compliance with ASTM D7566 and ASTM D4054.

As used herein, the terms "methanol" and "dimethyl ether" are used interchangeably with the terms MeOH and DME, respectively. "MeOH/DME" means MeOH and/or DME.

As used herein, "olefin stream" means a hydrocarbon stream rich in olefins comprising higher and lower olefins, and optionally also aromatics, paraffins, iso-paraffins and naphthenes, and in which the combined content of higher and lower olefins is at least 25 wt %, such as 30 wt % or 50 wt %.

As used herein, the term "higher olefins" means olefins having three (3) or more carbons (C3+ olefins), in particular C3-C8 olefins (C3=-C8=), including olefins having four (4) or more carbons (C4+ olefins), in particular C4-C8 olefins (C4=-C8=)

As used herein, the term "lower olefins" means an olefin having two carbons, i.e. ethylene (C2-olefin or synonymously C2= or ethene).

As used herein, the term "high content of higher olefins" means that the weight ratio in the olefin stream of higher olefins to lower olefins is above 1, suitably above 10, for instance 20-90 such as 70-80. Conversely, the term "low content of higher olefins" means that the weight ratio in the olefin stream of higher olefins to lower olefins is 10 or below, such as 1 or below.

As used herein, the term "selectivity to higher olefins" means the weight ratio of higher to lower olefins. "High selectivity to higher olefins" or "higher selectivity to higher olefins" means a weight ratio of higher to lower olefins of above 1, suitably above 10.

As used herein, the terms "C2-light fraction" means C2= and C1-2 hydrocarbons.

As used herein, the term "lower hydrocarbons" means C1-2 (e.g. methane, ethane) and optionally also C2=. The term is also used interchangeably with the term "light paraffins".

As used herein, the term "essentially free or ethylene" or "free of ethylene" means 1 wt % or lower. As used herein, the term "essentially free of aromatics", "substantially free of aromatics", "aromatic-free" or "low aromatics" means less than 5 wt %, e.g. 1 wt % or even less than 1 wt %. Aromatics include benzene (B), toluene (T), xylene (X) and ethylbenzene.

As used herein, the term "partial conversion of the oxygenates" or "partly converting the oxygenates" means a conversion of the oxygenates of 20-80%, for instance 40-80%, or 50-70%.

As used herein, the term "full conversion of the oxygenates" or "fully converting the oxygenates" means above 80% conversion of the oxygenates, for instance 90% or 100%.

As used herein, the term "substantial methanol conversion" is used interchangeably with the term "full conversion of the oxygenates", where the oxygenate is methanol.

As used herein, the terms "catalyst comprising a zeolite" and "zeolite catalyst" are used interchangeably.

As used herein, the term "silica to alumina ratio (SAR)" means the mole ratio of $SiO_2$ to $Al_2O_3$.

As used herein, the term "significant amount of paraffins" means 5-20 wt %, such as 10-15 wt % in the olefin stream.

It is an object of the present invention to provide a process and plant for the conversion of oxygenates such as methanol to olefins (MTO), that is capable of producing a more efficient olefin stream as feed for oligomerization, in particular an olefin stream (olefin feed for oligomerization) having low aromatics and high content of higher olefins, suitably also free of ethylene and optionally having a significant amount of isoparaffins.

It is another object of the present invention to provide such an olefin feed for oligomerization while still maintaining full conversion of the oxygenates.

These and other objects are solved by the present invention.

In a first aspect, the invention is a process for producing an olefin stream comprising passing a feedstock stream comprising oxygenates over a catalyst active in the conversion of oxygenates, thereby forming an olefin stream, said process comprising the steps of: passing the feedstock stream comprising oxygenates through a first reactor set including a single reactor or several reactors for the partial or full conversion of the oxygenates, and through a second reactor set including a single reactor or several reactors for the further conversion of the oxygenates and a phase separation stage in between the first reactor set and the second reactor set, for thereby forming the olefin stream.

It would be understood that the first reactor set is used for the passing therethrough of the feedstock comprising oxygenates thereby providing partial or full conversion of the oxygenates, while the second reactor set is used for the passing therethrough of the feedstock or a portion thereof after the partial or full conversion of the oxygenates and passage through the separation stage.

Thereby, large feedstocks comprising one or more oxygenates can be handled simultaneously and lower temperatures may be used in both reactor sets, which improves the lifetime conversion capacity of the catalyst and also improves the selectivity to higher olefins due to less cracking.

The approach of the present invention is completely different from the prior art, for instance the above-mentioned U.S. Pat. No. 5,177,179 A1, where an unreacted fresh methanol feed is split prior to the MTO instead of adding the entire feedstock (e.g. methanol feed) to the MTO. The selectivity and yields of the MTO reaction over any zeolite catalyst are highly dependent on the conversion level and in particular when approaching 100% conversion. Hence, it is actually very different to split the methanol feed and only react part of the methanol in a first MTO step at full conversion and then mix the resulting product with e.g. the other half of unreacted fresh methanol as in U.S. Pat. No. 5,177,179 A1, compared to a partial conversion in a first step and a full conversion of the product stream with unreacted methanol, as in the present invention.

In an embodiment, according to the first aspect of the invention, the several reactors in the first reactor set are mutually arranged in parallel.

It would be understood, that the term "mutually" means in between the reactors of a reactor set, e.g. arranged in parallel in between the reactors of the first reactor set.

In an embodiment according to the first aspect of the invention, the entire feedstock stream passes through the first reactor set, i.e. there is no substantial splitting of the feedstock stream.

As used herein, the term "entire feedstock" means at least 90 wt % of the feedstock.

In an embodiment according to the first aspect of the invention, the process further comprises:
  passing the feedstock stream comprising oxygenates through the first reactor set under conditions for partly converting, e.g. 40-80% such as 60-70% conversion, the oxygenates, thereby forming a raw olefin stream comprising unconverted oxygenates and C2-C8 olefins particularly C3-C8 olefins, e.g. the raw olefin stream may comprise water, methanol and C2-C8 olefins, particularly C3-C8 olefins;
  passing the raw olefin stream through said separation stage, for producing:
  a first olefin stream, which is rich in lower olefins;
  a separated oxygenate stream comprising the unconverted oxygenates, e.g. the separated oxygenate stream may comprise water and methanol;
  a second olefin stream, which is rich in higher olefins;
  combining the first olefin stream with the separated oxygenate stream comprising the unconverted oxygenates, thereby forming a combined stream comprising lower olefins and the unconverted oxygenates;
  passing the resulting combined stream comprising lower olefins and unconverted oxygenates through the second reactor set, e.g. to the first reactor of the second reactor set, under conditions for fully converting, e.g. 85%, 90%, 95% or higher, the unconverted oxygenates and the lower olefins, into a third olefin stream which is rich in higher olefins;
  combining the second olefin stream (which may be regarded as a by-pass stream of the second reactor set) with the third olefin stream, thereby forming said olefin stream, which preferably is rich in higher olefins and substantially free of aromatics.

For instance, the olefin stream, i.e. olefin product stream, contains less than 1 wt % aromatics. The olefin stream is suitably also free of ethylene e.g. less than 1 wt %, while having a significant content of isoparaffins e.g. 10-15 wt %.

Thereby increased flexibility in operation is achieved, particularly when handling large feedstock streams, without needing to e.g. divide the feedstock stream prior to entering a first reactor for conversion of oxygenates and pass it to a separate olefin interconversion reactor, as in U.S. Pat. No. 5,177,279. Furthermore, the temperatures in all reactor sets can be lowered significantly below 500° C., for instance down to 250-350° C., yet still achieving full conversion, e.g. up to 100% conversion of the oxygenates. In addition, further lowering the temperature increases also catalyst lifetime. Moreover, the process enables increased flexibility in the handling of a variety of feedstocks comprising oxygenates, including fatty acids in renewable feeds, or oxygenates originating from one or more of a biological source, as well as the handling of, optionally, different types in catalysts in the two different sets of reactors.

In an embodiment, the process further comprises adding an olefin stream comprising lower olefins, preferably being an olefin stream comprising C2-C3 olefins, more preferably a C3-olefin stream as co-feed to the first and/or second reactor set. Accordingly, in an embodiment, the process comprises recycling to the first and/or second reactor set a portion of the olefin stream, said portion of the olefin stream preferably being an olefin stream comprising C2-C3 olefins, more preferably a C3-olefin stream, which is withdrawn from said olefin stream, i.e. the olefin product stream from the second reactor set. The portion of the olefin stream is for instance recycled to said combined stream comprising lower olefins and the unconverted oxygenates and which is fed to the second reactor set. The portion of the olefin stream is for instance recycled to the feedstock stream comprising oxygenates which is fed to the first reactor set.

In other words, the process further comprises recycling a portion of the olefin stream to the feedstock stream and using it as additional feed stream, i.e. as a co-feed, and which may include recycling light paraffins, including methane, acting as a diluent, and reducing the adiabatic temperature increase, e.g. by combining with the feedstock stream comprising oxygenates. Thereby it is possible to further reduce the operating temperature of the oxygenate conversion and thereby improve both selectivity and catalyst lifetime.

The concentration of higher olefins in the olefin stream is further increased while also having full utilization of the less desired lower olefins for conversion into higher olefins. Any undesired cracking of higher olefins in the process is contained by recycling products of such cracking, namely C2-C3 olefins, back to the feed. Furthermore, this recycle, suitably also containing light paraffins and optionally also isoparaffins, further provides a dilution effect on the feedstock stream, thereby enabling better control of the exothermicity during the conversion to olefins.

The co-feed stream, i.e. the recycle stream, is between 1 to 20 times, such as 2 to 10 times, the volumetric amount of the feedstock stream e.g. methanol feed stream to the first reactor set.

In a particular embodiment, the recycle stream contains is 0.5-10% or 1-10% mol propylene and the concentration of methanol in the feed is 10 vol. %.

In particular, it has now been found that:
Co-feeding the lower (light) olefins, such as C3-olefin, enables the initiation of the MTO at lower temperatures. Hence, a further reduction in temperature is possible, for instance 350, 340, 320 or 300° C., or under adiabatic conditions, even lower, 280 or 260 or even 240° C. This conveys the benefit of further reduction in hydrogen transfer and thereby less production of paraffins, isomers and aromatic compounds, yet providing a higher olefin chain length i.e. higher olefins, as well as more freedom with respect to the total (or methanol partial) pressure; for instance, the pressure may be increased, which may be advantageous as i.a. there is a higher throughput in the MTO reactors and reduction in equipment size.
Further, it has surprisingly been found that there is also a dramatic increase in catalyst longevity when providing the co-feed compared to when there is no co-feed i.e. by using a neat methanol feed e.g. in the first reactor set.

It would be understood that the term "catalyst longevity" or "catalyst lifetime" comprises not only overall lifetime of the catalyst (number of cycles), but also the lifetime during each cycle, i.e. cycle time. The term "cycle time", also known as "cycle length" is the length of the period where the catalyst exhibits proper catalytic activity, and which is typically measured as hours-on-stream (HOS). From a process point of view this is highly beneficial, since the recycle stream of C2-C3 olefins will also enable easier control of the exothermicity of the MTO.

The feed to the second reactor set is a combined stream comprising lower olefins, e.g. C2-C3 olefins and the unconverted oxygenates. Thus, the invention provides an inherent addition of such co-feed (stream comprising C2-C3 olefins) to the second reactor set, where full conversion is desired. The benefits associated with co-feeding a stream comprising C2-C3 olefins, suitably a C3-olefin stream (propylene) in the MTO e.g. the first reactor set, are therefore already inherent in the process of the invention in connection with the feed to the second reactor set. Additional C2-C3 olefins may still be provided, e.g. by providing said recycle of a portion of the olefin stream.

In an embodiment according to the first aspect of the invention, the first reactor set consists of 2-4 reactors, such as 3 reactors, and the second reactor set consists of 1-3 reactors, such as 2 reactors.

In the first and second reactor set, the reactors are preferably mutually arranged in parallel. In large MTO plants handling large feedstock streams, normally several reactors are run in parallel, e.g. five (5) reactors. By the present invention it is possible to replace the 5 reactors in parallel by for instance the first reactor set consisting of three reactors, and the second reactor set consisting of two reactors. Thereby it is possible to run at full conversion by operating the first three reactors at e.g. only 70% conversion, and then further convert the unconverted oxygenates, e.g. methanol, together the C2-C3 olefins, to 100% in two reactors arranged in series to the first three. Again, the temperature in all five reactors is lowered, yet full conversion is achieved. Flexibility is also improved, by enabling that one reactor may be taken out of service for regeneration.

It would be understood that the first reactor set and second reactor set are arranged in series.

The olefin stream resulting from the process may contain higher olefins and/or lower olefins, as well as high and/or low content of aromatics. The process conditions such as pressure and temperature are adapted for obtaining an olefin stream which for instance is substantially free in aromatics and has a low content of higher olefins, or an olefin stream which is substantially free in aromatics and has a high content of higher olefins, suitably also free of ethylene and optionally having a significant amount of isoparaffins. The matrix table below shows the range of possibilities:

| Olefin stream | Lower olefins | Higher olefins |
|---|---|---|
| High aromatics | ✓ | ✓ |
| Low aromatics | ✓ | ✓ |

Thus, the olefin stream may comprise low aromatics as well as lower and higher olefins. The olefin stream may also comprise high aromatics as well as lower and higher olefins.

An olefin stream containing e.g. a high content of aromatics, for instance more than 10-20 wt % aromatics, is still a suitable oligomerization feed, since the final blend in the jet fuel may contain aromatics and/or these aromatics may also be converted to jet fuel in the subsequent oligomerization and hydrogenation steps.

In an embodiment, the catalyst comprises a zeolite having a structure selected from MFI, MEL, SZR, SVR, ITH, IMF, TUN, FER, EUO, MSE, *MRE, MWW, TON, MTT, AFO, AEL, and combinations thereof, preferably a zeolite with a framework having a 10-ring pore structure i.e. pore circumference defined by 10 oxygens, such as zeolites having a structure selected from TON, MTT, MFI, *MRE, MEL, AFO, AEL, EUO, FER, and combinations thereof.

These three letter codes for structure types are assigned and maintained by the International Zeolite Association Structure Commission in the Atlas of Zeolite Framework Types, which is at http://www.iza-structure.org/databases/ or for instance also as defined in "Atlas of Zeolite Framework Types", by Ch. Baerlocher, L. B. McCusker and D. H. Olson, Sixth Revised Edition 2007.

It would be understood that the term "temperature" means the MTO reaction temperature in an isothermal process, or the inlet temperature to the MTO in an adiabatic process.

The catalyst may be formed by combining the zeolite with a binder, and then forming the catalyst into pellets. The pellets may optionally be treated with a phosphoric reagent to create a zeolite having a phosphorous component between 0.5 and 15 wt % of the treated catalyst. The binder is used to confer hardness and strength on the catalyst. Binders include alumina, aluminum phosphate, silica, silica-alumina, zirconia, titania and combinations of these metal oxides, and other refractory oxides, and clays such as montmorillonite, kaolin, palygorskite, smectite and attapulgite. A preferred binder is an aluminum-based binder, such as alumina, aluminum phosphate, silica-alumina and clays.

In an embodiment, the process is conducted at a pressure of 1-60 bar and a temperature of 125-700° C. These conditions further specify the process requirements for achieving the above range of possibilities regarding content of aromatics and olefins. In particular, higher temperatures result in higher content of lower olefins.

It would be understood that the process conditions such as the above pressures and temperatures apply for both the first and the second reactor set.

In an embodiment, the process is conducted over a catalyst comprising a zeolite with a framework having a 10-ring pore structure, in which said 10-ring pore structure comprises (a) a unidimensional (1-D) pore structure, such as *MRE, for instance EU-2, and/or (b) a three-dimensional (3-D) pore structure, such as MFI, for instance MFI modified with an alkaline earth metal, e.g. a Ca/Mg-modified ZSM-5, in particular a Ca-modified ZSM-5; and at a pressure of 1-50 bar and temperature of 150-600° C.

It would be understood that the term "EU-2" may be used interchangeably with the term "ZSM-48".

A 1-D pore structure means zeolites containing non-intersecting pores that are substantially parallel to one of the axes of the crystal. The pores preferably extend through the zeolite crystal. A 3-D pore structure means zeolites containing intersecting pores that are substantially parallel to all three axes of the crystal. The pores preferably extend through the zeolite crystal.

As used herein, the term "Ca/Mg-modified ZSM-5" means a ZSM-5 modified with Ca and/or Mg.

The zeolite catalysts may be prepared by standard methods in the art. For instance, Ca and/or Mg are loaded in a commercially available ZSM-5 zeolite at concentrations of 1-10 wt. %, such as 2, 4 or 6 wt. %, by ion-exchange e.g. solid-state ion-exchange; or wet impregnation e.g. incipient wetness impregnation or any other suitable impregnation. For instance, impregnation of the final catalyst with binder/matrix, such as in a catalyst that contains up to 30-90 wt % zeolite, such as 50-80 wt % zeolite in a matrix/binder comprising an alumina component such as a silica-alumina matrix binder.

It would also be understood, that for the purposes of the present application, the term "binder" is also referred to as "matrix binder" or "matrix/binder" or "binder/matrix".

This enables obtaining an olefin stream with low aromatics content and also comprising lower and higher olefins:

| Olefin stream | Lower olefins | Higher olefins |
|---|---|---|
| High aromatics | — | — |
| Low aromatics | ✓ | ✓ |

Particularly at the higher temperatures, lower olefins will be formed, i.e. higher selectivity for lower olefins.

In a particular embodiment thereof, the catalyst comprises a zeolite having a (a) 1-D pore structure and/or (b) 3-D pore structure, the pressure is 1-50 bar such as 2-20 bar and the temperature is 500-550° C. This results in low aromatics and low content of higher olefins:

| Olefin stream | Lower olefins | Higher olefins |
|---|---|---|
| High aromatics | — | — |
| Low aromatics | ✓ | — |

In another particular embodiment thereof, the catalyst comprises a zeolite having a (a) 1-D pore structure and/or (b) 3-D pore structure, the pressure is 1-50 bar, such as 2-20 bar or 5-10 bar, and the temperature is 150-480° C., such as 150-350° C., 200-300° C., or 250-350° C. In another embodiment, the pressure is 2-30 bar, for instance 2-20 bar or 5-10 bar, and the temperature is 340-400° C., for instance 340-385° C. or 360-380° C. This results in low aromatics and high content of higher olefins:

| Olefin stream | Lower olefins | Higher olefins |
|---|---|---|
| High aromatics | — | — |
| Low aromatics | — | ✓ |

It has been found that despite the relatively low temperatures, i.e. reaction temperatures of 150-480° C., the catalysts are active in not only suppressing the formation of aromatics, but also in providing a high selectivity for higher olefins as well as full conversion of the oxygenate feed.

In another particular embodiment, where the catalyst comprises a zeolite with a framework having a 10-ring pore structure, in which said 10-ring pore structure comprises a three-dimensional (3-D) pore structure, such as MFI, e.g. a Ca/Mg-modified ZSM-5, in particular a Ca-modified ZSM-5, and the temperature is in the range 340-400° C., a significant increase in higher olefins is observed as well as a sharp decrease in aromatics content, while still fully converting the oxygenates, e.g. methanol.

Hence, the above combination of features according to these particular embodiments, i.e. the particular combination of zeolite type, pressure and temperature, enables the production of an olefin stream which is an ideal oligomerization feed for the further conversion to jet fuel, particularly SAF in accordance with ASTM as defined above.

While a suitable oligomerization feed may have some aromatics, for instance 10-20 wt % aromatics, as well as higher and lower olefins, the ideal oligomerization feed is namely substantially free of aromatics and composed of higher olefins, and preferably as little as possible C2-light fraction. The olefin stream may e.g. comprise at least 20 wt % C4-C8 olefins, such as above 30 wt % C4-C8 olefins or above 40 wt % C4-C8 olefins and less than 10 wt % aromatics e.g. less than 5 wt % aromatics. The lower the temperature, the higher the content of higher olefins and thereby also the ratio of higher olefins to lower olefins, i.e. the selectivity to higher olefins. Thus, the oligomerization feed complies with the above ASTM requirements stipulating the 50% SAF blending part to be almost aromatic-free, more specifically that the content of aromatics be limited to below 0.5 wt %. The olefin stream can be converted into such jet fuel via oligomerization and hydrogenation in a more efficient overall process due to i.a. less recycling and higher oligomerization yields. In other words, the higher olefins and low selectivity to aromatics simplifies separation steps and increase overall yields of the jet fuel.

By using the moderately high pressure of 2-20 bar, in particular 5-10 bar, it is now possible to further shift the selectivity towards higher olefins. It has namely been found that while higher pressures increase the ratio of higher olefins to lower olefins i.e. higher selectivity to higher olefins, the higher pressures may also decrease the total yield of olefins (i.e. lower conversion of the oxygenate feed to olefins) and also increase the required temperature to achieve full conversion, which in turn creates the risk of less desired cracking reactions taking place. At the pressure range of 5-10 bar, it is now possible to obtain a higher selectivity to higher olefins without requiring increasing the temperatures to high levels for achieving full conversion, thereby also reducing the occurrence of cracking reactions.

At the same time, reducing the temperature to for instance 250° C. or 300° C. or 350° C. or 360° C., despite this in principle implying a reduction in oxygenate e.g. methanol conversion, in fact significantly assists in the process. Without being bound by any theory, it is believed that the low acid strength of for instance EU-2 or ZSM-23 or Ca/Mg-ZSM-5 suppresses the formation of aromatics. However, the low acid strength means that relatively high temperatures are necessary for achieving reasonable methanol conversions and such temperature increase would result in also increasing the rate of olefin cracking as mentioned above, thereby countering the effect of the increased pressure. Accordingly, by the present invention and contrary to the prior art, the pressure may be increased, and the temperature lowered, resulting in that it is still possible to maintain substantial methanol conversion, whilst at the same time achieving an olefin stream substantially free of aromatics and having a high content of higher olefins.

In another embodiment, a reactor in the first reactor set and/or second reactor set operates at 2-30 bar, such as 5-15 bar, and at 150-480° C. such as 150-350° C. or 200-300° C.

In an embodiment, the zeolite has a 1-D pore structure and is any of *MRE (ZSM-48), MTT (ZSM-23), TON (ZSM-22), or combinations thereof; and optionally having a silica-to-alumina ratio (SAR) of up to 110, such as ZSM-48 having SAR up to 110; and the process is conducted at a pressure of 1-25 bar such as 1-15 bar, and a temperature of 240-360° C. such as 300-360° C.

In another particular embodiment, the first reactor and second reactor set use a catalyst comprising a zeolite having a unidimensional (1-D) pore structure which is any of *MRE (ZSM-48), MTT (ZSM-23), TON (ZSM-22), or combinations thereof, as recited above. Suitably, the first and second reactor set use the same catalyst.

In another particular embodiment, a reactor in the first reactor set and second reactor set operates at 1-25 bar, such as 1-15 bar, and at 260-360° C. such as 300-360° C. e.g. 320° C. or 340° C.

In an embodiment, the zeolite has a silica-to-alumina ratio (SAR) of up to 240. In a particular embodiment, the zeolite has a SAR of up to 110, such as up to 100. In another particular embodiment, the zeolite has a SAR is higher than 10, for instance 15 or 20, or 30, 40, 50, 60, 70, 80, 90, 100.

In another particular embodiment in which the catalyst comprises a zeolite with a 1-D pore structure as recited above, the pressure is 2-25 bar, such as 2, 5, 10 or 12 or 17 or 20 or 22 bar. It has been found that while higher pressures (above 25 bar) increase the ratio of higher olefins to lower olefins i.e. higher selectivity to higher olefins, the higher pressures may also decrease the total yield of olefins (i.e. lower conversion of the oxygenate feed to olefins) and also increase the required temperature to achieve full conversion, which in turn creates the risk of less desired cracking reactions taking place. At the pressure range recited above for instance 2-10 bar, 5-10 bar or 1-15 bar or more broadly 1-25 bar, it is now possible to obtain a higher selectivity to higher olefins without requiring increasing the temperatures to high levels for achieving full conversion, thereby also reducing the occurrence of cracking reactions. Further, the formation of ethylene is suppressed, and so is the formation of aromatics. The olefin stream, therefore, contains the higher olefins C3-C8 as well as isoparaffins. In particular, conducting the process at higher pressures than atmospheric have the effect of enabling an amount of diluent as "heat sink" for the exothermal reaction.

In an embodiment, the feedstock stream e.g. to the first reactor set, is combined with a diluent, i.e. an inert diluent, such as nitrogen or carbon dioxide or a light paraffin such as methane, thereby reducing the exothermicity in the conversion to olefins, which is particularly preferred when the catalyst is arranged as a fixed bed. For instance, where the feedstock stream is methanol, it is diluted with e.g. nitrogen so that the methanol concentration in the feedstock is 2-20 vol. %, preferably 5-10 vol. %.

It would be understood that the lower the methanol concentration in the feedstock, the higher the pressure which is required to maintain high methanol conversion, since the partial pressure of methanol ($P_{MeOH}$), is the actual relevant parameter to track during operation of the process. For instance, where the concentration of methanol in the feedstock is 10 vol. %, and the MTO is operated at a $P_{MeOH}$ of 0.3 or 0.5 bar, this corresponds to the pressure in the MTO being 3 or 5 bar, respectively. If the concentration of methanol in the feedstock is 5 vol. %, and the MTO is operated at a $P_{MeOH}$ of 0.3 or bar, this corresponds to the pressure in the MTO being 6 or 10 bar.

A pressure at the higher end of the range, e.g. 15 bar or 20 bar or 25 bar, enables better match—and thereby significant compression energy savings—with the pressure of a subsequent Hydro/OLI, as also explained farther below. The invention provides therefore also a process whereby it is now possible to closely match the pressure of the MTO with the pressure of the subsequent Hydro/OLI, while still maintaining high conversion and an olefin stream (olefin product) which is ideal for subsequent oligomerization and/or Hydro/OLI.

It has now also been found, that at the low temperatures of the MTO according to an embodiment of the present invention in which particularly a 1-D zeolite such as ZSM-48 is utilized and at temperatures of 360° C. or below, the partial pressures of the feed, e.g. methanol ($P_{MeOH}$), do not play a decisive role in terms of selectivity to aromatics. This is contrary to the common understanding that methanol partial pressures play a decisive role in the selectivity to aromatics and paraffins. This means, that compared with operation of the MTO at temperatures higher than 360° C., where $P_{MeOH}$ has a high effect on the amount of aromatics produced, with higher $P_{MeOH}$ significantly generating higher content of aromatics; by the present invention where operation of the MTO is conducted at temperatures of 360° C. or below, e.g. 320° C., changing the $P_{MeOH}$ does not show any significant influence, as the content of aromatics is maintained below 2 wt % or below 1 wt % and at similar values regardless of the $P_{MeOH}$.

For instance, with MTO operating at 400° C., at $P_{MeOH}$ of 0.3 and 0.5 the content of aromatics is about 2 wt % and 6 wt %, respectively. When operating the MTO at 360° C., at $P_{MeOH}$ of 0.3 and 0.5 the content of aromatics is about 1 wt % and 2 wt %, respectively. When operating the MTO at 320° C., at $P_{MeOH}$ of 0.3 and 0.5 the content of aromatics is about 1 wt % at both $P_{MeOH}$.

Thus, the higher the $P_{MeOH}$, the higher the content of aromatics. By reducing the temperature according to an embodiment of the present invention, it is possible to increase the $P_{MeOH}$ to some degree and thereby the pressure (total pressure), without producing more aromatics.

Hence, by the present invention in which particularly a 1-D zeolite such as ZSM-48 is utilized and at temperatures of 360° C. or below, the higher independence of the aromatic content with respect to $P_{MeOH}$ at the lower MTO temperatures, for instance at temperatures of 350° C. or below, such as 340° C. or 320° C. or 300° C., enables also operation at the higher end of the pressures, e.g. 15, 20 or 25 bar. Not only are these pressures better matched to the downstream operations, e.g. oligomerization or Hydro/OLI, as mentioned above, but they are also closer to the pressures used in the upstream process, in particular methanol synthesis, which operates at high pressures, typically about 50-100 bar. Higher energy savings in terms of lower compression energy is thereby achieved, as so is a reduction in equipment size.

Despite the relatively low temperatures used, i.e. reaction temperatures of 240-360° C., the catalysts comprising any of *MRE (ZSM-48), MTT (ZSM-23), TON (ZSM-22), or combinations thereof, are active in not only suppressing the formation of aromatics, but also in providing a high selectivity for the higher olefins C3=-C8=, no ethylene formation, optionally significant isoparaffin formation, and full conversion, while also showing an extended catalyst lifetime.

For instance, it has been found that ZSM-48, when applied at said low temperatures, converts methanol to an olefin stream which is ideal for further oligomerization to jet fuel, particularly SAF in accordance with ASTM as defined above. The fact that the product is essentially free of ethylene and aromatics, which are considered unwanted, while the yield of C3-C8 olefins is between 70-80%, combined with 10-15% isoparaffins, makes the product an ideal feed for further oligomerization to SAF.

Compared to the prior art according to U.S. Pat. No. 4,476,338, where MTO is conducted over a ZSM-48 having SAR of 113 or 180 and at 370° C. (Example 1 and 2 therein), in the present invention where MTO is conducted at temperatures of 360° C. or below with a ZSM-48 which may contain some impurities, e.g. 1 wt %, with a lower SAR, there is a higher production of total olefins (e.g. C2-C8 olefins); lower production of ethylene, for instance the content of ethylene now being less than 1 wt %; lower production of aromatics, for instance the content of aromatic compounds now being less than 1 wt %; and optionally higher production of isoparaffins, for instance now 10-15 wt %. Furthermore, the lifetime of the catalyst is increased, as explained below.

The combination of operating the oxygenate conversion with e.g. ZSM-48 with SAR up to 110 and lower temperature (300-360° C.) conveys at least three highly beneficial effects:

a) the selectivity to ethylene and aromatics is decreased to below 1 wt % in either case.

b) a significant amount of isoparaffins may be formed, which can be used in the process. Isoparaffins, as well as the C3-C8 olefins, may also be oligomerized, so that in a way, instead of forming the unwanted ethylene and aromatics as byproducts, isoparaffins may be formed as a desired product. The isoparaffins may optionally be separated for alkylation to increase octane number and then be incorporated into the gasoline pool, or simply be used as part of the olefin stream for downstream oligomerization. c) due to the lower applicable temperature, the overall lifetime (number of cycles) of the catalyst is increased as an effect of the lower dealumination rate (affected by the combination of high temperature and water vapor produced during reaction). Further, the lifetime (during each cycle i.e. cycle time) of the catalyst is substantially increased, which without being bound by any theory, is probably an effect of the lower selectivity to aromatics due to less hydrogen transfer reactions. High catalyst longevity in terms of both overall lifetime (number of cycles) and cycle time, is highly important for enabling its use in actual commercial applications.

For the purposes of the present application, the terms "catalyst longevity" and "catalyst lifetime" are used interchangeably.

Moreover, if a binder is included in the catalyst, which is relevant for commercial applications, the present invention will also enable a higher yield of desired products, e.g. C3-C8 olefins, since no or limited MeOH/DME cracking to methane occurs.

Accordingly, when conducting the MTO with a catalyst comprising a zeolite with a 1-D pore structure, as recited above, the features of the invention cooperate synergistically to bring about a superior process which is commercially applicable for conversion of the oxygenates to olefins and thereby for the subsequent downstream steps, e.g. oligomerization.

In a particular embodiment, the weight hour space velocity (WHSV) is 0.5-12 $h^{-1}$, such as 1.5-10, or 4-10, for instance 6, 8, or 10 $h^{-1}$. In another particular embodiment, the weight hour space velocity (WHSV) in the first reactor set is higher than in the second reactor set. For instance, in the first reactor set where partial conversion of the oxygenate feedstock is intended, the WHSV is suitably 3 $h^{-1}$ or 6 $h^{-1}$ while in the second reactor set where full conversion is intended the WHSV is suitably 2 $h^{-1}$.

Especially when e.g. conducting the process with a catalyst comprising a zeolite having a 3-D pore structure, such as Ca-ZSM-5, at the higher values of WHSV, for instance in the range 6-10 $h^{-1}$, despite this normally conveying a reduction of oxygenate conversion, e.g. methanol conversion, it has now also been found that the formation of aromatics may be significantly reduced while not paying a penalty in terms of methanol conversion to particularly higher olefins. Without being bound by any theory, it may appear that two consecutive repetitive cycles take place; a first cycle in which precursor olefin compounds oligomerize, and a second cycle in which higher olefins cyclize and dehydrogenate to form aromatic compounds, which are maintained as active species at the intersection of pores in the zeolite. Due to the high WHSV, i.e. low residence times, the cycles are in a way interrupted already in the first cycle, thus significantly impeding even more the further formation of aromatic compounds. Accordingly, the present invention counterintuitively invites to not only increase the pressure and reduce the temperature, but also optionally to use a high space velocity, for instance in the first reactor set.

In an embodiment according to the first aspect of the invention, the catalyst is arranged as a fixed bed.

In an embodiment according to the first aspect of the invention, the feedstock comprises oxygenates derived from one or more oxygenates taken from the group consisting of triglycerides, fatty acids, resin acids, ketones, aldehydes or alcohols or ethers, where said oxygenates originate from one or more of a biological source, a gasification process, a pyrolysis process, Fischer-Tropsch synthesis, or methanol-based synthesis. In a particular embodiment, said one or more oxygenates are hydroprocessed oxygenates. By "hydroprocessed oxygenates" is meant oxygenates such as esters and fatty acids derived from hydroprocessing steps such as hydrotreating and hydrocracking.

In an embodiment according to the first aspect of the invention, the oxygenates are selected from methanol (MeOH), dimethyl ether (DME), or combinations thereof. These are particularly advantageous oxygenate feedstocks, as these are widely commercially available. DME is more reactive than methanol and thus enables running the MTO step at lower temperatures, thereby increasing the selectivity for higher olefins. Furthermore, conversion of DME, releases only half the amount of water (steam) compared to methanol, thereby reducing the rate of (irreversible) deactivation due to steam-dealumination of the zeolite catalyst.

Suitably, water is removed from the olefin stream produced in the MTO, since its presence may be undesirable when conducting the downstream oligomerization.

In an embodiment according to the first aspect of the invention, the methanol is made from synthesis gas prepared by using electricity from renewable sources such as wind or solar energy, e.g. eMethanol™. Hence, in an embodiment, the synthesis gas is prepared by combining air separation, autothermal reforming or partial oxidation, and electrolysis of water, as disclosed in Applicant's WO 2019/020513 A1, or from a synthesis gas produced via electrically heated reforming as for instance disclosed in Applicant's WO 2019/228797. Thereby, an even more sustainable approach for the production of jet fuel, in particular SAF, is achieved. While methanol can be produced from many primary resources (including biomass and waste), in times of low wind and solar electricity costs, the production of eMethanol™ enables a sustainable front-end solution.

In a particular embodiment, the process of the invention further comprises, prior to passing the feedstock stream comprising oxygenates over a catalyst active in the conversion of oxygenates, in which the feedstock comprising oxygenates is a methanol stream i.e. methanol feed stream:
producing said methanol feed stream by methanol synthesis of a methanol synthesis gas, wherein the methanol synthesis gas is generated by: steam reforming of a hydrocarbon feed such as natural gas, and/or at least partly by electrolysis of water and/or steam.

Hence, in another particular embodiment, the methanol feed stream is produced from methanol synthesis gas which is generated by combining the use of water electrolysis in an alkaline or PEM electrolysis unit, or steam in a solid oxide electrolysis cell (SOEC) unit, thereby generating a hydrogen stream, together with the use of a $CO_2$-rich stream in a SOEC unit for generating a stream comprising carbon monoxide and carbon dioxide, then combining the hydrogen stream and the stream comprising carbon monoxide and carbon dioxide for generating said methanol synthesis gas, as e.g. disclosed in Applicant's co-pending European patent application No. 20216617.9. The methanol synthesis gas is then converted into the methanol feed stream via a methanol synthesis reactor, as is well-known in the art.

The methanol synthesis gas, as is also well-known in the art, is a mixture comprising mainly hydrogen and carbon monoxide tailored for methanol synthesis i.e. by the methanol synthesis gas having a module $M=(H_2-CO_2)/(CO+CO_2)$. The methanol synthesis gas used for the methanol synthesis is normally described in terms of said module M, since the synthesis gas is in balance for the methanol reaction when M=2.

Thereby, an alternative highly sustainable front-end solution for generating the methanol feed stream, i.e. methanol synthesis gas, is provided, whereby only electrolysis is utilized for generating the methanol synthesis gas and thereby the methanol.

It would thus be understood, that as used herein, the term "process" may also encompass the prior (front-end) production of the methanol feed stream, as recited above.

In an embodiment according to the first aspect of the invention, the process is conducted under the presence of hydrogen. The hydrogen improves the methanol conversion by at least slightly decreasing the rate of deactivation of the catalyst, thereby also increasing catalyst lifetime. Yet, when conducting the process, there is no addition of hydrogen, since this conveys a risk of hydrogenating some olefins and thereby decrease the olefin yield.

In an embodiment according to the first aspect of the invention, the process further comprises:
separating from the olefin stream an isoparaffin stream.

In an embodiment according to the first aspect of the invention, the process further comprises:
passing at least a portion of the olefin stream e.g. after separating said isoparaffin stream, through an oligomerization step over an oligomerization catalyst, and optionally subsequently conducting a separation step, for thereby producing an oligomerized stream; and
passing at least a portion of the oligomerized stream through a hydrogenation step over a hydrogenation catalyst, and optionally subsequently conducting a separation step, for thereby producing a hydrocarbon stream comprising hydrocarbons boiling in the jet fuel range.

The isoparaffins, as well as the C3-C8 olefins, may also be oligomerized. Hence, the invention enables in a way, that instead of having unwanted aromatics as byproduct, isoparaffins are now provided as a desired product, which may optionally be separated for use as alkylation feed to increase octane number of gasoline optionally also produced in the process. The provision of the isoparaffin stream separation step increases also flexibility in the selection of zeolites structures used in the oligomerization step.

In an embodiment according to the first aspect of the invention, the entire olefin stream passes through the oligomerization step. As used herein, the term "entire olefin stream" means at least 90 wt % of the stream.

In an embodiment according to the first aspect of the invention, the olefin stream, e.g. the entire olefin stream after separating said isoparaffin stream, is passed directly to the oligomerization step, i.e. the olefin stream is in direct fluid communication with the oligomerization step, or combined oligomerization and hydrogen step, as explained farther below. Thereby, there is no fractionation of the olefin stream prior to entering the oligomerization step, thus further simplifying the process and plant.

The oligomerization step is preferably conducted by conventional methods including the use of an oligomerization catalyst such as solid phosphoric acid ("SPA"), ion-exchange resins or a zeolite catalyst, for instance a conventional *MRE, BEA, FAU, MTT, TON, MFI and MTW catalyst, at a pressure of 30-100 bar, such as 50-100 bar, and a temperature of 100-350° C. The products from the oligomerization reaction may be subsequently separated in the separation step, such as distillation, thereby withdrawing a lighter hydrocarbon stream such as naphtha, which comprises C5-C7 hydrocarbons, and the oligomerized stream, which comprises C8+ hydrocarbons.

The hydrogenation step is preferably conducted by conventional methods including under the presence of hydrogen the use of a hydrotreating or hydrogenation catalyst, for instance a catalyst comprising one or more metals, e.g. Pd, Rh, Ru, Pt, Ir, Re, Co, Mo, Ni, W or combinations thereof, at a pressure of 60-70 bar and a temperature of 50-350° C. The C8+ hydrocarbons of the oligomerized stream are thereby saturated to form the corresponding paraffins. These may be subsequently separated in a separation step, for instance a distillation step, whereby any hydrocarbons boiling in the diesel range are withdrawn and thereby separated from the hydrocarbons boiling in the jet fuel range i.e. jet fuel.

In an embodiment according to the first aspect of the invention, the entire oligomerized stream passes through the hydrogenation step. As used herein, the term "entire oligomerized stream" means at least 90 wt % of the stream.

In a particular embodiment, the hydrocarbon stream comprising hydrocarbons boiling in the jet fuel range is SAF, i.e. a sustainable aviation fuel in compliance with ASTM D7566 and ASTM D4054.

In an embodiment to the first aspect of the invention, the oligomerization step and hydrogenation step are combined in a single hydro-oligomerization step (Hydro-OLI), e.g. by combining the steps in a single reactor. In other words, by passing at least a portion of the olefin stream trough an oligomerization step and hydrogenation step which are combined in a single hydro-oligomerization step, and optionally subsequently conducting a separation step, for thereby producing a hydrocarbon stream comprising said hydrocarbons boiling in the jet fuel range. This results in a much simpler process/plant layout.

As used herein, the term "single hydro-oligomerization step" or more generally "single step" or "single stage" means a section of the process in which no stream is withdrawn.

Typically, a single stage does not include equipment such as compressors, by which the pressure is increased.

The oligomerization step is dimerization, optionally also trimerization, i.e. by conducting the oligomerization at conditions suitable for dimerization and/or trimerization. Thereby the single reactor is preferably operated at a relatively low pressure, such as 15-60 bar, for instance 20-40 bar. The oligomerization reaction is very exothermic per oligomerization step and much less heat is produced,—since there is only dimerization, optionally also trimerization—instead of higher oligomerization such as tetramerization or even pentamerization. The lower heat produced favors approaching equilibrium, i.e. high conversion of olefins.

Normally, the oligomerization step converts the olefins to a mixture of mainly dimers, trimers and tetramers or even pentamers; for instance, a C6-olefin will result in a mixture comprising C12, C18, C24 products and probably also higher hydrocarbons. By conducting the oligomerization step at conditions suitable for dimerization, optionally also trimerization, a more selective and direct conversion of the higher olefins (C3-8 olefins incl. C4-C8 olefins) to the jet fuel relevant hydrocarbons, namely C8-C16, is obtained. The dimerization and optional trimerization step comprises the use of lower pressures than in conventional oligomerization processes, thereby also reducing compression requirements which translates into higher energy efficiency—due to lower compression energy—as well as reduced costs, e.g. reduced costs of the oligomerization reactor and attendant equipment, as well as reduced operating costs due to less need of separating C16+ olefins otherwise formed in conventional OLI reactors. Accordingly, the pressure of the Hydro/OLI can be adapted to better match the pressure of the previous oxygenate conversion step.

Moreover, instead of using a dedicated separation such as distillation in the OLI step for separating naphtha and another dedicated separation in the hydrogenation step for separating diesel from the jet fuel, only one subsequent separation stage, if any, will be needed. Thereby a simpler process for oligomerization and hydrogenation is obtained and consequently also a simpler overall process and plant.

The hydrogenation or $H_2$-addition is conducted in the same reactor, for instance by adjusting the activity of the hydrogenation component e.g. nickel. In an embodiment, the single hydro-oligomerization step is conducted in a single reactor having a stacked reactor bed where a first bed comprises an oligomerization catalyst, e.g. zeolite catalyst, and a subsequent bed comprises a hydrogenation catalyst.

The hydro-oligomerization step is conducted by reacting, under the presence of hydrogen, the olefin stream over a catalyst comprising a hydrogenation metal, such as a hydrogenation metal selected from Pd, Rh, Ru, Pt, Ir, Re, Co, Cu, Mo, Ni, W and combinations thereof, and preferably at a pressure of 15-60 bar such as 20-40 bar, and a temperature of 50-350° C., such as 100-250° C. In a particular embodiment, the catalyst comprises a zeolite having a structure selected from MFI, MEL, SZR, SVR, ITH, IMF, TUN, FER, EUO, MSE, *MRE, MWW, TON, MTT, FAU, AFO, AEL, and combinations thereof, preferably a zeolite with a framework having a 10-ring pore structure i.e. pore circumference defined by 10 oxygens, such as zeolites having a structure selected from TON, MTT, MFI, *MRE, MEL, AFO, AEL, EUO, FER, and combinations thereof. These zeolites are particularly suitable due to the restricted space of the zeolite pores, thereby enabling that the dimerization is favored over larger molecules. Optionally, the weight hour space velocity (WHSV) is 0.5-6 $h^{-1}$, such as 0.5-4 $h^{-1}$.

Lower pressures corresponding to the operating at conditions for dimerization, optionally also trimerization, are in particular 15-30 bar, such as 20-40 bar. This, again, is significantly lower than the pressures normally used in oligomerization, which typically are in the range 50-100 bar.

The present invention purposefully uses conditions that result in a mild hydrogenation. Particularly suitable catalysts are catalysts comprising NiW, for instance sulfide NiW (NiWS), or Ni such as Ni supported on a zeolite having a FAU or MTT structure, for instance a Y-zeolite, or ZSM-23. The catalyst which is active for oligomerization and hydrogenation may for instance contain up to 50-80 wt % zeolite in a matrix/binder comprising an alumina component. The hydrogenation metal may then be incorporated by impregnation on the catalyst. The hydrogenation metals are selected so as to provide a moderate activity and thereby better control of the exothermicity of the oligomerization step by mainly hydrogenating the dimers being formed as the oligomerization takes place, thereby interrupting the formation of higher oligomers.

Hence, rather than having separate reactors and attendant separation units for conducting oligomerization and subsequent hydrogenation, each with its own catalyst, the present invention enables in a single hydro-oligomerization step the use of less equipment e.g. one single reactor, one type of catalyst, optionally a single separation stage downstream for obtaining the jet fuel. A more efficient and simpler overall process and plant for the conversion of oxygenates such as methanol to jet fuels, particularly SAF, is thereby achieved.

In an embodiment according to the first aspect of the invention, a stream comprising C8-hydrocarbons resulting from cracked C9-C16 hydrocarbons, is withdrawn from said hydrocarbon stream comprising hydrocarbons boiling in the jet fuel range and added to the other processes. For instance, the process according to the first aspect of the invention cooperates with a refinery plant (or process), in particular a bio-refinery, and the stream comprising C8-hydrocarbons is added to the gasoline pool in a separate process for producing gasoline of said refinery. Optionally, a stream comprising C8-hydrocarbons resulting from cracked C9-C16 hydrocarbons, is withdrawn from said hydrocarbon stream comprising hydrocarbons boiling in the jet fuel range and used (recycled) as additional feed stream to the oligomerization step or the single hydro-oligomerization step.

In a second aspect, the invention relates to a plant for producing an olefin stream from a feedstock comprising oxygenates, said plant being an oxygenate conversion section, such as MTO section, comprising:

a first reactor set including a single reactor or several reactors, preferably mutually arranged in parallel, for the partial or full conversion of the oxygenates;
and in series arrangement with the first reactor set,
a second reactor set including a single reactor or several reactors, preferably mutually arranged in parallel, for the further conversion of the oxygenates, and a phase separation section arranged in between the first reactor set and the second reactor set, for thereby forming the olefin stream;
wherein
the first reactor set includes a single reactor or several reactors, preferably mutually arranged in parallel, adapted for receiving said feedstock comprising oxygenates and for the partial or full conversion of the oxygenates, thereby forming a raw olefin stream comprising unconverted oxygenates and C2-C8 olefins;
the phase separation section comprises in particular a three-phase separator, arranged downstream the first reactor set, said phase separation section being adapted for receiving said raw olefin stream and forming: a first olefin stream, which is rich in lower olefins, particularly C2-C3 olefins; a separated oxygenate stream comprising the unconverted oxygenates, e.g. the separated oxygenate stream may comprise water and methanol; a second olefin stream, which is rich in higher olefins, particularly C3-C8 olefins incl. C4-C8 olefins;
a mixing device, e.g. a mixing unit, for combining the first olefin stream with the separated oxygenate stream comprising the unconverted oxygenates, thereby forming a combined stream comprising lower olefins, particularly C2-C3 olefins, and the unconverted oxygenates;
the second reactor set includes a single reactor or several reactors, preferably mutually arranged in parallel, and arranged downstream said phase separation section, adapted for receiving said combined stream, thereby forming a third olefin stream which is rich in higher olefins, particularly C3-C8 olefins incl. C4-C8 olefins;
a mixing device, e.g. a mixing unit, for combining the second olefin stream (which may be regarded as a by-pass stream of the second reactor set) with the third olefin stream, thereby forming said olefin stream.

In connection with any of the above-mentioned mixing devices, a compressor is preferably arranged therein, e.g. downstream the mixing device, for boosting the pressure of the combined stream to the pressure of a downstream unit, such as the pressure of the second reactor set, or the pressure required in an optional downstream oligomerization and hydrogenation of the olefin stream.

Any of the embodiments and associated benefits according to the first aspect of the invention and associated benefits may be used with the second aspect of the invention, or vice versa.

DETAILED DESCRIPTION

Figure 1:
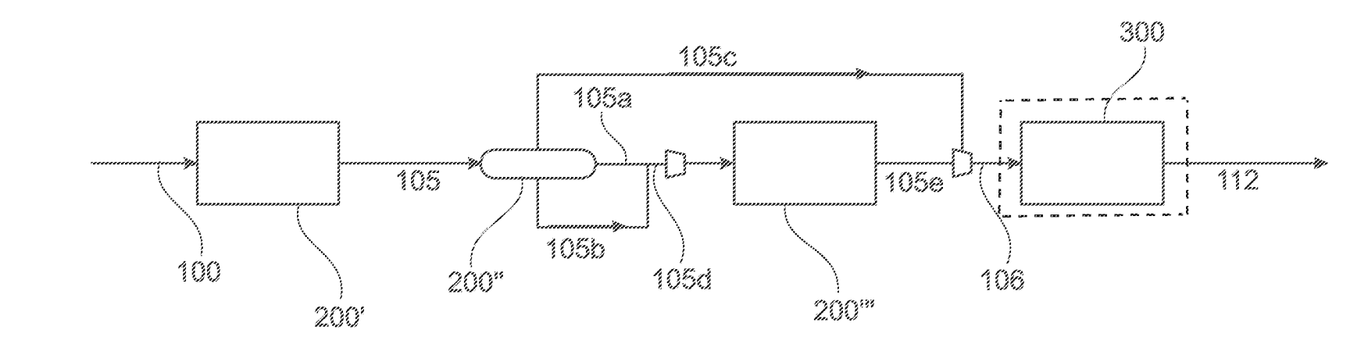
The sole FIGURE is a simplified FIGURE showing the conversion of oxygenates to olefins and optional further conversion to jet fuel in accordance with an embodiment of the invention.

With reference to the FIGURE, an oxygenate conversion section 200, such as MTO section, is shown and optionally (stippled lines) an oligomerization and hydrogenation section 300 for further conversion into jet fuel. A feedstock stream 100 comprising oxygenates such as methanol and/or DME passes through a first reactor set 200', for instance 3 reactors arranged in parallel, for thereby achieving 50-70% conversion of the methanol and producing a raw olefin stream 105 comprising water, methanol and olefins e.g. C2-C8 olefins. The raw olefin stream 105 is subjected to separation in a 3-phase separator 200" thereby producing a first olefin stream 105a, which is rich in lower olefins, particularly C2-C3 olefins or mainly C2-olefins (ethylene), a separated oxygenate stream 105b comprising the unconverted oxygenates (unconverted methanol), and a second olefin stream 105c which is rich in higher olefins, particularly C3-C8 olefins incl. C4-C8 olefins. The first olefin stream 105a is combined with the separated oxygenate stream 105b comprising the unconverted oxygenates, thereby forming a combined stream 105d comprising lower olefins, particularly C2-C3 olefins or mainly ethylene, and the unconverted oxygenates. This combined stream is pressurized and fed to a second reactor set 200''' arranged downstream, and which may for instance include two reactors arranged in parallel, for thereby achieving full conversion e.g. 85% or 90% or higher. The first reactor set 200' and second reactor set 200''' are thereby arranged in series. A third olefin stream 105e is produced which is rich in higher olefins, particularly C3-C8 olefins incl. C4-C8 olefins. Finally, the second olefin stream 105c (bypass stream) is combined with the third olefin stream 105e, thereby forming said olefin stream 106 which may have been pressurized. By the above arrangement of the MTO section 200, the rectors of the first and second set can be operated at low temperature, e.g. 250-350° C. or 260-360° C., which improves the life-time conversion capacity of the catalysts used and also improve the selectivity to higher olefins due to less cracking. The resulting olefin stream 106, suitably after removing its water content, is optionally further converted (as shown by the stippled lines) in a downstream oligomerization and hydrogenation section 300, which is combined as a single hydro-oligomerization step, for instance in a single reactor, thereby producing a hydrocarbon stream 112 comprising hydrocarbons boiling in the jet fuel range (C8-C16), particularly SAF.

The invention claimed is:

1. A process for producing an olefin stream from a feedstock stream comprising oxygenates, said process comprising the steps of:
passing the feedstock stream comprising oxygenates through a first reactor set including a single reactor or several reactors, and over a catalyst active in conversion of oxygenates, for partial conversion of the oxygenates, and through a second reactor set including a single reactor or several reactors for further conversion of the oxygenates and a phase separation stage in between the first reactor set and the second reactor set, for thereby forming the olefin stream,
wherein the process comprises:
passing the feedstock stream comprising oxygenates through the first reactor set under conditions for partly converting the oxygenates, thereby forming a raw olefin stream comprising unconverted oxygenates and C2-C8 olefins; and
passing the raw olefin stream through said phase separation stage, for producing:
a first olefin stream, which is rich in lower olefins;
a separated oxygenate stream comprising the unconverted oxygenates; and a second olefin stream, which is rich in higher olefins;

combining the first olefin stream with the separated oxygenate stream comprising the unconverted oxygenates, thereby forming a combined stream comprising lower olefins and the unconverted oxygenates;

passing the resulting combined stream comprising lower olefins and unconverted oxygenates through the second reactor set under conditions for fully converting the unconverted oxygenates and the lower olefins, into a third olefin stream which is rich in higher olefins;

combining the second olefin stream with the third olefin stream, thereby forming said olefin stream.

2. The process according to claim 1, wherein the several reactors in the first reactor set and/or second reactor set are mutually arranged in parallel.

3. The process according to claim 1, wherein the process comprises recycling to the first and/or second reactor set a portion of the olefin stream.

4. The process according to claim 1, wherein the first reactor set consists of 2-4 reactors, and the second reactor set consists of 1-3 reactors.

5. The process according to claim 1, wherein the catalyst comprises a zeolite having a structure selected from MFI, MEL, SZR, SVR, ITH, IMF, TUN, FER, EUO, MSE, *MRE, MWW, TON, MTT, AFO, AEL, and combinations thereof; and wherein the conditions of the first reactor set and the conditions of the second reactor are a pressure of 1-60 bar and a temperature of 125-700° C.

6. The process according to claim 5, wherein the catalyst comprising a zeolite has a framework having a 10-ring pore structure, in which said 10-ring pore structure comprises (a) a unidimensional (1-D) pore structure; and wherein the conditions of the first reactor and the conditions of the second reactor are a pressure of 1-50 bar and temperature of 150-600° C.

7. The process according to claim 5, in which the zeolite has a 1-D pore structure and is any of *MRE (ZSM-48), MTT (ZSM-23), TON (ZSM-22), or combinations thereof; and optionally having a silica-to-alumina ratio (SAR) of up to 110; and wherein the conditions of the first reactor and the conditions of the second reactor are a pressure of 1-25 bar, and a temperature of 240-360° C.

8. The process according to claim 1, wherein the feedstock stream is combined with a diluent, the feedstock stream is methanol and it is diluted to a methanol concentration in the feedstock of 2-20 vol. %.

9. The process according to claim 1, wherein the feedstock comprising oxygenates is derived from one or more oxygenates taken from the group consisting of triglycerides, fatty acids, resin acids, ketones, aldehydes or alcohols or ethers, where said oxygenates originate from one or more of a biological source, a gasification process, a pyrolysis process, Fischer-Tropsch synthesis, or methanol-based synthesis.

10. The process according to claim 1, wherein the oxygenates are selected from methanol (MeOH); dimethyl ether (DME); or combinations thereof.

11. The process according to claim 1, further comprising: separating from the olefin stream an isoparaffin stream.

12. The process according to claim 1, further comprising:

passing at least a portion of the olefin stream through an oligomerization step over an oligomerization catalyst, and optionally subsequently conducting a separation step, for thereby producing an oligomerized stream; and passing at least a portion of the oligomerized stream through a hydrogenation step over a hydrogenation catalyst, and optionally subsequently conducting a separation step, for thereby producing a hydrocarbon stream comprising hydrocarbons boiling in the jet fuel range.

13. The process according to claim 12, wherein the oligomerization step and hydrogenation step are combined in a single hydro-oligomerization step, wherein the oligomerization step is dimerization, optionally also trimerization, by the hydro-oligomerization step being conducted by reacting, under the presence of hydrogen, the olefin stream over a catalyst comprising a hydrogenation metal.

* * * * *